United States Patent [19]

Batson

[11] 3,795,980
[45] Mar. 12, 1974

[54] CHUCK DEVICE FOR SABRE SAWS
[75] Inventor: William A. Batson, Pickens, S.C.
[73] Assignee: The Singer Company, New York, N.Y.
[22] Filed: Nov. 29, 1972
[21] Appl. No.: 310,304

[52] U.S. Cl............................ 30/394, 83/699, 83/747
[51] Int. Cl............................................. B27b 19/08
[58] Field of Search........ 30/392, 394; 83/747, 699, 83/697, 698

[56] References Cited
UNITED STATES PATENTS
1,502,088  7/1924  Colby................................. 30/394
3,547,166  12/1970  Dudek................................ 83/699

Primary Examiner—Donald R. Schran
Attorney, Agent, or Firm—Marshall J. Breen; Chester A. Williams, Jr.; Harold Weinstein

[57] ABSTRACT

A chuck device for sabre saws in which said device includes a chuck block having an aperture with a tapered portion therein, fixedly connected to the outer end of the saw bar which also has a tapered portion that terminates in an end portion of reduced diameter. Connecting means clamp the chuck block on the saw bar to lock the respective tapered portions against each other and prevent turning of the chuck block relative to the saw bar. The saw blade is clamped upon the chuck block in an offset position from the axis of the saw bar.

5 Claims, 4 Drawing Figures

PATENTED MAR 12 1974 3,795,980
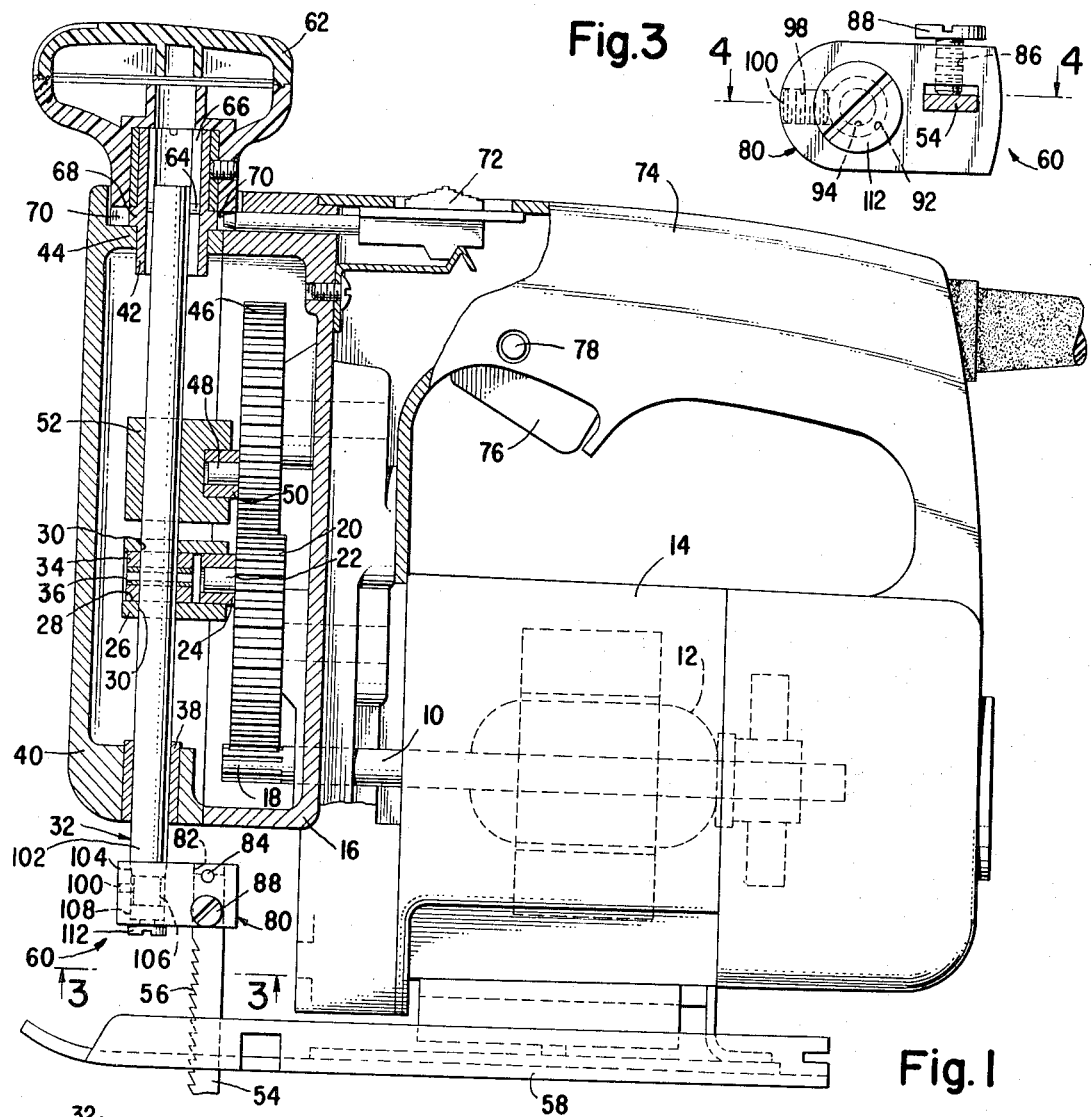
Fig. 3
Fig. 1
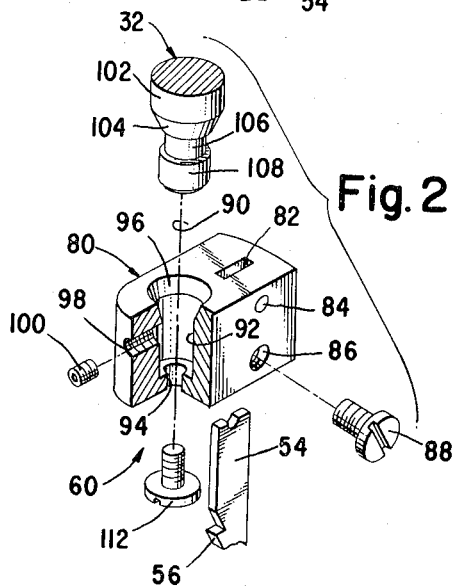
Fig. 2
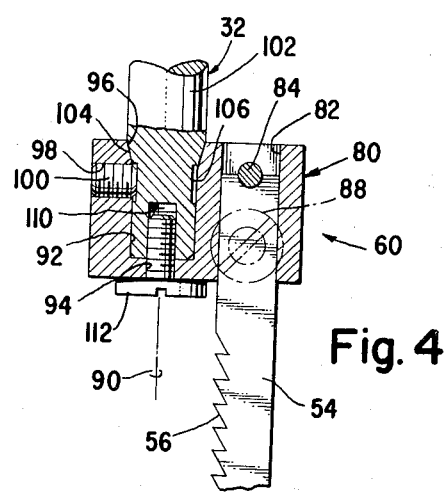
Fig. 4

CHUCK DEVICE FOR SABRE SAWS

BACKGROUND OF THE INVENTION

Heretofore, the sabre saws of the prior art have used chucks connected to the outwardly extending end of the saw bar by means of pins or a plurality of set screws. Due to vibration and wear, such connections have proved to be unsatisfactory over long periods of time, and have resulted eventually in the connection becoming loose and wobbly to produce inaccurate cutting, or binding and breaking of the saw blade.

SUMMARY OF THE INVENTION

It is therefore an object of the present invention to provide an improved chuck device for sabre saws; which is simple, economical and reliable; which overcomes the prior art disadvantages; which has a tapered interconnection between the saw bar and chuck; which provides a positive mechanical connection between the saw bar and chuck device; which has the saw blade connected to the chuck offset from the axis of the saw bar; and which is locked in angular position with respect to the saw bar.

Other objects and advantages will be apparent from the following description of one embodiment of the invention, and the novel features will be particularly pointed out hereinafter in the claims.

BRIEF DESCRIPTION OF THE DRAWINGS

This invention is illustrated in the accompanying drawings in which:

FIG. 1 is a longitudinal, elevational view, partly in section, of a sabre saw embodying the present invention.

FIG. 2 is an exploded perspective view, partly in section, showing the improved chuck device of the present invention.

FIG. 3 is a bottom plan view taken along line 3—3 of FIG. 1.

FIG. 4 is an elevational view, partly in section, taken along line 4—4 of FIG. 3.

DESCRIPTION OF THE INVENTION

Referring now to FIG. 1 of the illustrated embodiment of the invention, a shaft 10 of a driving electric motor 12 mounted in a housing 14, extends into a gear housing 16 and is formed with a splined portion 18 which meshes with and drives a gear 20 journaled in the gear housing 16. The gear 20 carries an eccentric pin 22 surmounted by a roller 24 which engages the slide portion of a crosshead 26. The crosshead 26 has a central transverse opening 28 in communication with the slide portion. A pair of aligned holes 30 are formed in the top and bottom of the crosshead 26 perpendicular to the transverse opening 28 of a circular diameter just slightly larger than the cross-sectional diameter of a saw bar 32 which extends therethrough. The saw bar 32 is free to turn about its axis within the hole 30 of the crosshead 26, but is held axially captive by an annular collar 34 exposed in the opening 28 and affixed to the saw bar 32 by a split pin 36, as illustrated in FIG. 1. The saw bar 32 is journaled for linear movement in a sleeve bearing 38 secured in the bottom portion of the gear housing cover 40, and a journal bushing 42 secured in the top 44 of the combined gear housing 16 and the gear housing cover 40. A gear 46 journaled in the gear housing 16 meshes with gear 20 and by means of an eccentric pin 48 and roller 50, drives an upper balancing crosshead 52 which is free to turn and slide on the saw bar 32.

Upon operation of the sabre saw, the motor shaft 10 will drive the gear 20 which, through pin 22 and roller 24 working in crosshead 26, transmits linear axial reciprocatory motion to the saw bar 32 and drives an affixed saw blade 54 having a cutting edge 56 in a linear reciprocatory path substantially normal to the plane of a work contacting shoe 58.

The saw blade 54 is affixed to the saw bar 32 by an improved chuck device designated generally 60, which serves to interconnect the saw blade 54 and the saw bar 32.

The journal bushing 42 is connected to a control knob 62, which when in unlocked position, may be rotated by the operator to control the angular position of the saw bar 32 and the saw blade 54. The saw bar 32 is free to reciprocate within the journal bushing 42, but is interconnected by a pin 64 which reciprocates within a slot 66 formed in the journal bushing 42. Thus, turning of the journal bushing 42 will turn the saw bar 32 through the trapped pin 64. Further, the journal bushing 42 has a flange 68, the outer periphery of which, has angularly disposed slots 70 circumferentially spaced thereabout. The control knob 62 may be locked in non-turnable position by inserting a slide switch 72 within one of the slots 70. Removal of the slide switch 72 from the slot 70 permits operator turning of the control knob 62 and interconnected saw bar 32 and saw blade 54. The slide switch 72 is mounted in the upper portion of a handle 74 which is secured to the gear housing 16 in superposition to and cantilevered over the motor 12, and carries a conventional trigger switch 76 and associated lock button 78 on the underside thereof for actuating the motor 12 in the usual manner. The slide switch 72 is slidably mounted within the handle 74 intermediate the trigger switch 76 and the control knob 72.

The improved chuck device 60 is shown best in FIGS. 2 and 4 and includes a chuck block 80 having a vertical blade aperture 82 extending through the chuck block on one side thereof, with a transverse pin 84 extending across its upper end. Below the pin 84, a tapped hole 86 communicates with the aperture 82 to receive a blade locking screw 88, so that when the saw blade 54 is disposed into the aperture 82, it will abut the pin 84 prior to the screw 88 being tightened to clamp the blade 54 within the aperture 82 of the chuck block 80. The blade aperture 82 is offset from the axis 90 of the saw bar 32 by being spaced from a counterbored aperture or hole 92 to which the saw bar 32 is connected. The vertical counterbored hole 92 is formed on the other side of the chuck bock 80 with the smallest opening 94 facing the bottom. The upper end of the counterbored hole 92 is tapered as at 96 to flare outwardly as illustrated in FIG. 2. A tapped hole 98 is formed in the front of the chuck block 80 to communicate with the counterbored hole 92 intermediate the bottom opening 94 and the tapered portion 96. A set screw 100 is threadedly received in the tapped hole 98 as illustrated in FIGS. 2, 3 and 4, for purposes more fully explained hereinafter.

The saw bar 32 has an outer end 102 which extends below the sleeve bearing 38. A tapered section 104 is formed on the outer end upwardly from the bottom to slope downwardly and inwardly. An annular groove 106 is formed below the tapered section 104. An end section 108 of a diameter smaller than the diameter of the saw bar 32 but of larger cross-sectional area than the annular groove 106, is formed at the bottom of the saw bar 32. A tapped hole 110 extends axially upwardly from the bottom of the saw bar, as best seen in FIG. 4. The outer end 102 of the saw bar 32 from the tapered section downwardly, is sized to mate within the counterbored hole 92 of the chuck block 80 in which position the annular groove 106 will be placed in alignment with the tapped hole 98. The tapered section 96 and 104 respectively, are sloped to correspond to each other. Upon the outer end 102 of the saw bar 32 being inserted into the counterbored hole 92 of the chuck block 80, a locking screw 112 will be threadedly received in the tapped hole 110 to lock the chuck block 80 to the saw bar 32. The set screw 100 will be threaded against the angular groove 106 to lock the chuck block 80 in desired position and prevent angular movement with respect to the saw bar 32. This provides for a positive mechanical connection by means of the screws 100 and 112, to the outer end 102 of the saw bar 32 in different planes, while the frictional contact of the mating tapered sections securely clamps the chuck block 80 relative the saw bar 32. The offset mounting of the saw blade 54 to the chuck device 60 is advantageous during both straight cutting and further provides a mechanical advantage during scroll or free form cutting.

It wll be understood that various changes in the details, materials, arrangements of parts and operating conditions, which have been herein described and illustrated in order to explain the nature of the invention, may be made by those skilled in the art within the principles and scope of the invention.

I claim:

1. A sabre saw for driving a saw blade comprising:
   a. a housing,
   b. a motor mounted in the housing,
   c. a saw bar journaled in the housing and drivingly connected to the motor to be reciprocated along a linear axis,
   d. the saw bar having an outer end extending from the housing,
   e. the outer end having a tapered portion terminating in an end portion of reduced diameter,
   f. a chuck means having an aperture with a tapered portion therein disposed upon the outer end of the saw bar,
   g. connecting means clamping the chuck means upon the saw bar to lock the respective tapered portions against each other and to prevent turning of the chuck means relative the saw bar, and
   h. means clamping the saw blade upon the chuck means offset from the axis of the saw bar.

2. The combination claimed in claim 1 wherein:
   a. the connecting means including an axially extending tapped hole formed in the bottom of the saw bar and a screw passing into the aperture of the chuck means to be threadedly received in the tapped hole and to force the respective tapered portions into clamped engagement with each other.

3. The combination claimed in claim 2 wherein:
   a. the connecting means including means to prevent turning of the chuck means and saw bar relative each other.

4. The combination claimed in claim 3 wherein:
   a. a tapped hole formed in the chuck means in communication with the aperture and below the tapered portion;
   b. a set screw threadedly received in the tapped hole to engage and lock the saw bar and the chuck means from relative rotation.

5. A sabre saw for driving a saw blade comprising:
   a. a housing,
   b. a motor mounted in the housing,
   c. a saw bar journaled in the housing and drivingly connected to the motor to be reciprocated along a linear axis,
   d. the saw bar having an outer end extending from the housing,
   e. the outer end having a tapered portion terminating in an end portion of reduced diameter,
   f. a tapped hole formed in the bottom of the saw bar to extend upwardly in the axial direction,
   g. a chuck block having a blade slot on one side and an aperture on the other side,
   h. a taper portion formed in the aperture corresponding to the tapered portion of the outer end of the saw bar,
   i. a screw connected in the tapped hole to force the corresponding taper portions against one another to lock the chuck block upon the saw bar, and
   j. means interconnecting the chuck block and the saw bar to prevent turning of the chuck block relative the saw bar, and
   k. means connecting the saw blade within the blade slot.

* * * * *